United States Patent [19]
Arndt

[11] 3,843,828
[45] *Oct. 22, 1974

[54] PREPARATION OF A SIMULATED MILK PRODUCT

[75] Inventor: Robert H. Arndt, Red Wing, Minn.

[73] Assignee: Ralston Purina Company, St. Louis, Mo.

[ * ] Notice: The portion of the term of this patent subsequent to Feb. 15, 1989, has been disclaimed.

[22] Filed: Feb. 11, 1972

[21] Appl. No.: 225,604

Related U.S. Application Data

[63] Continuation-in-part of Ser. No. 642,737, June 1, 1970, Pat. No. 3,642,493.

[52] U.S. Cl............... 426/360, 426/356, 426/364, 426/519, 426/520
[51] Int. Cl...................... A23c 21/00, A23c 11/00
[58] Field of Search .................... 99/17, 14, 98, 64; 426/356, 519, 520, 522, 364

[56] References Cited
UNITED STATES PATENTS

| | | | |
|---|---|---|---|
| 3,642,490 | 2/1972 | Hawley et al. | 426/364 |
| 3,642,493 | 2/1972 | Arndt | 99/64 |

*Primary Examiner*—David M. Naff
*Attorney, Agent, or Firm*—W. Dennis Drehkoff; Virgil R. Hill

[57] ABSTRACT

A simulated milk product is prepared by a process involving forming a mixture of sweet whey and isolated vegetable protein, adjusting the pH of the mixture and subjecting the mixture to heating and vapor flash treatment to remove objectionable flavors and odors. A special vegetable oil or fat is added before or after the vapor flash treatment. After the vapor flash treatment and after fat addition, the pH is adjusted and the mixture is subjected to severe homogenization.

14 Claims, No Drawings

PREPARATION OF A SIMULATED MILK PRODUCT

This application is a continuation-in-part application of my copending application Ser. No. 642,737 filed June 1, 1967 now U.S. Pat. No. 3,642,493.

BACKGROUND OF THE INVENTION

This invention relates to food products, and more particularly to a simulated milk beverage product containing vegetable protein and vegetable oil or fat substances, which may be substituted for whole milk as a food additive or ingredient. It also relates to a method of preparing a simulated whole dairy milk using vegetable protein and hydrogenated vegetable oil substances.

The concept of using vegetable materials to prepare so-called "milk" type products has been known for many decades. In fact, many different methods and compositions have been proposed for achieving this. A few of these products have been or are being employed to a limited extent as an additive in foods where the flavor and odor characteristic of vegetable proteins, particularly soy proteins or the like, can be masked by other flavors.

However, as is well-known in the industry, even though these vegetable based products have somewhat of a "milky" character, no realistic attempt has been made to try to commercially substitute the actual beverage of whole dairy milk by these simulated milk products since the flavor difference is clear, distinct, and unappealing, the texture difference gives the simulated products a poor and unpleasant "mouth feel," and the appearance of the simulated products is quite unlike milk in color and degree of opacity. Milk is a very bland flavored product and extremely difficult to match in flavor because the stronger flavors of substitute materials have always been clearly detectible. Further, its appearance as a suspension has not been subject to accurate duplication with vegetable food materials, partially because of the high dispersibility of milk solids and low dispersibility of vegetable solids in water, such dispersibility including ability to partially dissolve and partially suspend as tiny non-settling particles, and partially because of the off-yellow, off-brown, or off-green color of the vegetable based liquid.

Yet, in view of rising dairy costs, and of food shortages in parts of the world, a definite need has existed for a low cost, highly nutritious product that could be substituted freely for whole dairy milk as a beverage, without having to slowly condition people to a completely new taste and appearance of a beverage.

The object of this invention is to provide a method of preparing a simulated dairy milk beverage type food using whey, vegetable protein, and treated vegetable oils, by blending them in a special fashion and under specially controlled conditions, and subsequently heating the blended product in a fashion to produce a beverage with substantially all the nutritional qualities of milk and with substantially all the flavor, appearance, and texture of a milk beverage. The product is of relatively lower cost than the corresponding dairy product, and employs vegetable materials that are in relatively greater abundance than dairy products. In fact, the novel product enables the use of proteins obtained from soybean materials remaining after oil extraction, yet without the characteristic soy odor or flavor being detectible in the very bland beverage produced. Further, if desired, a buffering agent, such as food grade phosphates, like disodium phosphate, dipotassium phosphate and sodium citrate may be added to the product to improve the suspendability thereof.

SUMMARY OF THE INVENTION

The novel method centers around the basic steps of blending sweet dairy whey and an isolated, non-animal protein, preferably isolated soy protein in controlled rations, adjusting the pH of the mixture to about neutral, heating to a high temperature and retaining the mixture at the elevated temperature for a predetermined period of time, subjecting the mixture to flash off vaporization while releasing the pressure thereon to remove objectionable flavors and odors and thereafter blending in a vegetable oil in a specific amount. If desired, the vegetable oil may be blended with the mixture of isolated soy protein and whey prior to the heating and vapor flash treatment. Important specific details of the novel product and process are spelled out hereinafter.

DESCRIPTION OF THE PREFERRED EMBODIMENTS

As indicated, the novel food product is composed chiefly of an isolated vegetable protein ingredient and sweet dairy whey which may have been pretreated, and vegetable oils hydrogenated a controlled amount to provide a vegetable fat of a specific melting point range.

The novel concept involves a special heat and pressure treatment of a mixture of whey and isolated non-animal protein, such as isolated vegetable proteins preferably isolated soy protein but including those from peanuts, sesame seeds, sunflower seeds, flax seeds, cotton seeds, and the like. The vegetable oil may be added to the mixture of whey and isolated vegetable proteins either before or after the special heat and pressure treatment of the mixture. Isolated soy protein is the preferable ingredient as most of the development work for this invention has been conducted using soy material. The product employs isolated vegetable protein resulting from certain preliminary separation operations. These operations will be described with respect to soybean and edible soy protein products because this was the major area of concern for which the invention was developed, and because the invention is particularly suited to the use of soybean materials.

The soybean meal or flakes resulting from oil extraction contains many ingredients including complex proteins, sugars, fibers, and others. The proteins and sugars are dissolved out of the solids by adding the flakes to an aqueous bath and adding a food grade alkaline material to raise the pH substantially above 7. Typical of such alkaline reagents are sodium hydroxide, potassium hydroxide, calcium hydroxide, magnesium hydroxide or other commonly accepted food grade alkaline reagents. The material is then slurried for a period of time sufficient to put the proteins into a fine stable colloidal suspension and soluble soy components into solution, usually about 30 minutes or so. The resulting liquor solution is separated from the solids, as by passing the material through a screen and/or centrifuging. Preferably, the liquor is then cycled through a clarifier to remove tiny cellular particles.

The soy proteins are then precipitated from the liquor by lowering the pH to an acidic value near or at the isoelectric point of the protein, usually a pH of 4.6 – 4.9, with the addition of a common food grade acidic reagent such as phosphoric acid, hydrochloric acid, acetic acid, citric acid, tartaric acid, or others. The precipitate is then separated as by centrifuging, and washed with water to substantially remove occluded sugars, except for a small amount of sugar which is practically impossible to remove. The precipitate is then made into an aqueous suspension or slurry with the whey by adding water to the precipitate and mixing with dry whey, or the precipitate may be spray dried and blended with liquid whey or the precipitate may be added directly to the liquid whey. Of course, other methods may be used for forming the desired suspension or slurry of isolated soy protein material and whey.

The sweet dairy whey is obtained as a by-product from dairy operations such as production of sweet dairy cheese, e.g., cheddar cheese. It is subjected to a heating operation prior to the blending with the other materials. This type of treatment of dairy products such as whey is known, and usually involves heating of the whey in an aqueous liquid at temperatures in the range of about 220° F. – 260° F. (at least above 200° F.) for a short period of time to concentrate the whey and which may be controlled to heat denature the protein of the whey or not heat denature the protein depending on the operator's preference and the end product desired. A significant point to note is that this treatment of the whey is done prior to mixing with the vegetable protein material and the vegetable oil. The whey material is preferably treated in conventional low pressure dairy concenrating equipment, which is well known in the art.

The whey as discharged from the evaporator is then in the form of a concentrate and may be formed into the desired suspension of slurry as previously discussed. Desirably, the soy protein material is added directly to the concentrated whey.

If the whey has previously been dried and is in powder form, when added to a slurry of soy protein material, the combined product should be heated to about 140° F. to assure complete dissolving of the whey in water.

The combination of the ingredients may be controlled so that the final artificial milk product will have a protein content of between about 7% and 50%, and preferably 15% to 40%, on a dry weight basis and a fat content of about 8% to 65%. Preferably, the fat will be in the product in an amount of about 15% to 45%. Since normal sweet dairy whey has approximately 12% protein and soy isolate is about 90% protein, the ratios of sweet dairy whey, soy isolate and fat may be adusted to achieve the abovementioned protein and fat content. Preferably, the whey will be present in an amount of about 94% to 47% and the isolated soy protein in an amount of about 6% to 53% by weight for the non-fat portion of the product.

Desirably, the soy isolate and whey will be mixed, heat vapor flash treated and the vegetable oil added thereafter. However, it should be understood that the vegetable oil may be added prior to the heating and vapor flash treatment. If the non-fat portion of the product, i.e., soy isolate and whey, is to be heated and vapor flash treated prior to the addition of the vegetable oil, the soy isolate and whey mixture prepared, as previously discussed, is put into a proper suspension form by adjusting the pH to a generally neutral range of about 5.8 to 7.5, and preferably 6.2 to 6.9, with the addition of an edible, food grade alkaline reagent, preferably sodium hydroxide, potassium hydroxide, magnesium hydroxide, calcium hydroxide, or mixtures thereof. This adjustment of the pH may be accomplished either by adjusting the pH of the isolated soy protein prior to the blending with the whey or by adjusting the pH of the mixture during or after blending.

The suspension to be further processed should have a controlled solids content of about 3% – 50% by weight, and preferably about 5% – 45% by weight. If it falls below about 3%, subsequent processing steps are not economically advisable when a continuous process is employed. Drying is particularly costly. Above about 50% solids content, the increase in viscosity of the suspension makes further processing difficult. The solids content which may be conveniently processed will depend on the ratio of soy protein and whey present in the product, but generally the greater the amount of soy utilized, the lower the solids content must be.

This suspension may then be subjected to a physico-thermo-vapor flash treatment including dynamic, practically instantaneous heating to a controlled elevated temperature range, and dynamic physical working both preferably performed almost simultaneously. Currently, the most satisfactory way of achieving this is to pass a suspension at high velocity through a device commonly known as a Jet Cooker. It includes adjacent jet nozzle orifices, normally concentric, through which the suspension and the pressurized steam used as a heating agent are ejected at high velocities in intersecting flow patterns. Each tiny bit of suspension is instantly dynamically heated by the steam while practically simultaneously being subjected to severe physical forces at the nozzle and by the impacting steam. The physical working of each tiny portion is believed to molecularly expose to further action, certain obnoxious substances held to the twisted protein molecules, and this physical working with the elevated temperature heat treatment is believed to weaken and/or break the tenacious bond between these noxious substances and the complex protein molecules to an extent where these substances can be laded away by flashed off vapors, as described hereinafter. The temperature range to which the suspension is heated for the desired results is about 220° F. to 400° F., although the temperature should not be in the lower region of this range unless the product is subsequently vented into a vacuum chamber after being held under pressure in a special holding chamber explained hereinafter. Normally the temperature should be about 285° F. to 320° F. for best results.

The product is introduced to the jet cooker nozzle at a positive pressure. This pressure should be at a value near the pressure of the steam injected into the suspension, should be sufficient to cause high velocity discharge of the slurry through the jet nozzle, and must be greater than the pressure in a pressure retention chamber positioned immediately downstream of the nozzle. Normally the steam pressure is about 80 to 85 psig, with the suspension line pressure being substantially the same as the steam pressure, when the injection occurs and the discharge pressure in the chamber downstream of the nozzle is normally about 75 to 80 psig. The pressure drop of the slurry across the nozzle is about 5 to 15 psig, depending upon these other pressures, with 6 to 10 psig being common.

The time interval of the suspension in the nozzle is estimated to be about one second or less. The nozzle orifice for the slurry is small, being only a fraction of an inch, e.g., about ⅛ inch, so that the suspension solids are subjected to severe dynamic, physical stresses or working during passage. The steam intermixes intimately with the material in the ejected suspension. The amount of steam required is not great, normally being an amount which lowers the solids content of the suspension only about 1% to 3% by weight.

Preferably, the nozzle orifices are concentric, with the suspension being ejected from the center orifice, for example, and the steam from a surrounding annular orifice oriented to cause its output flow path to intersect the output flow path of the center orifice. The suspension and steam could be ejected from the alternate orifices, however. Further, the adjacent orifices need not necessarily be concentric to obtain this interaction.

As noted previously, the steam and suspension are ejected into a special retention chamber. This may comprise an elongated tube through which the intermixed suspension and steam moves from the jet nozzle on one end of the tube to a pressure controlled discharge on the other end. The size and configuration of this chamber are not really critical. The discharge can be controlled by a conventional pre-set pressure release valve to enable continuous process flow from the nozzle to and out of the discharge valve. This valve regulates the pressure in the holding chamber. The pressure in this chamber must be great enough to prevent any significant vaporization of the moisture in the chamber, even though the temperature is well above the boiling point of water. A pressure of about 75 to 80 psig readily achieves this. Since the suspension and steam must continuously flow into this pressurized chamber, the pressure behind the suspension and the steam must be greater than the chamber pressure to cause this continuous flow.

The heated suspension is retained in the holding chamber for a definite but relatively short time period of a few seconds up to a few minutes, normally of about 7 seconds to about 100 seconds. It is only necessary to retain the product in this heated condition for a few seconds for optimum results. The time is not too critical in this range, although the longer the suspension is held, the greater the likelihood of the discoloration or browning of the product with subsequent release of pressure, particularly at higher temperatures of treatment.

The pressure on the suspension is then instantly released by discharging the suspension to a reduced pressure zone, into a suitable receiving means that is normally at or near atmospheric pressure or below. This discharging operation is normally progressive for the suspension that passes progressively throughout the chamber. This discharge and sudden pressure release causes "flash off" of a portion of the moisture in the form of water vapor which is laden with the entrained odiferous, obnoxious, characteristic, pungent chemical components or substances of unknown composition from the soy product. The flash off also causes substantial cooling of the remaining suspension because of the heat of vaporization absorbed from the suspension, so that the total time for which the product is subjected to elevated temperatures is actually very short and controlled. Removal of the substance-laden vapors from the product removes the objectionable flavor and odor characteristics.

This special treatment of the vegetable protein and whey mixture not only removes objectionable odor and flavor, but also importantly causes retention in the product of the property of high dispersibility in water possessed by the raw material. In fact, the dispersibility usually decreases only a few percent. Conventional treatments of such materials normally lowers dispersibility down to values of about 20% or so.

The reduced pressure zone into which the suspension is discharged is preferably a partial vacuum but may also be at atmospheric pressure. This is effective in reducing the temperature of the product very rapidly. In either case, the vapors shold be instantly conductd away from the suspension, preferably by moving a current of air across the suspension or by drawing a continuous vacuum on the discharge zone to draw the vapors away. The vapors may be specially condensed in a fashion to positively remove the condensate from the area of the collected discharged suspension. In production, the suspension may be discharged from the back pressure control discharge valve directly into a vessel in the open atmosphere where the vapors are allowed and/or caused to rise directly away from the suspension and are prevented from condensing in a manner to allow the condensed substance to flow back into the product. To assure complete removal of the vapors from the purified suspension without allowing the vapors to recondense back into the suspension, the suspension and vapor should be separated from each other immediately after discharge, i.e., immediately after pressure release. In this regard, it is undesirable to cause passage of both components through a common conduit downstream of the discharge valve, and if such is done, it should be minimal.

The resulting purified slurry is whitish and attractive in appearance. This purified suspension should then have a maximum solids content of about 50% by weight depending on the ratio of soy isolate to whey, since a higher solids content creates difficulty in subsequent processing due to high viscosity. It should be noted that as a general rule, the higher the isolated soy protein material in the product, the lower the solids content should be for convenience processing. Such a suspension is actually a dispersion in the nature of a solution-suspension, part of the solids being in solution and part in suspension.

As an alternative, the whey and protein isolate mixture may be subjected to a heat treatment, such as in a spiratherm heater, without the sever mechanical working during the heating, followed by the holding or retention step, as previously discussed, and thereafter the mixture would be subjected to atomization to achieve sufficient physical working or exposure of the surfaces of the particles to remove the undesirable flavor and odor causing characteristics from the mixture. The heating in the spiratherm would be to a temperature in the range of 220° to 400° F. and preferably 285° – 320° F. with the mixture being held at this temperature for a brief period of time, normally about 7 seconds to about 100 seconds. Thereafter, when the pressure on the slurry is released, the slurry is subjected to a high degree of atomization in order to obtain sufficient physical working, stresses or exposure of the surfaces of the particles of the slurry to cause flash off vaporization of vapor laden with substances that possess undesirable flavor and odor characteristics. As noted previously, it is then important that the vapors be conducted away from the slurry to prevent the vapors from recondensing back into the slurry. The resulting purified slurry is whitish and attractive in appearance and is substantially identical to the material treated by the jet cooker heat treatment.

Vegetable Oil Or Fat Ingredient

The particular type of edible vegetable oil employed is not critical and may constitute one or more of soy oil, corn oil, conconut oil, safflower oil, and the like. Experimentation has shown that the character of the final product can be controllably varied in its likeness to fresh dairy products by controlled hydrogenation of at least part of the vegetable oils. According to conventional terminology, the term oil is employed when the material is liquid at normal room temperature, while the term fat is employed when the material is solid at room temperature. Since the basic composition remains the same, and since the desired melting point range of the final ingredient is near, at, or somewhat above the room temperature range, the terms oil and fat will be used herein generally interchangeably, except that when non-hydrogenated, the term oil will be applied, descriptively rather than restrictingly. The degree of hydrogenation will vary somewhat depending upon the oils used and the exact nature of the product desired. Specifically, by varying the fraction of the oil hydrogenated or the degree of hydrogenation of part or all of the oil, the degree of creaminess of the final product can be varied between that of fresh whole milk and fresh cream. As a guide, the hydrogenation is regulated so that the melting point of the total combined vegetable fat ingredient to be added is preferably in the range of about 84° F. and 97° F., and should be in the range of about 77° – 104° F. It has been found that this can be easily achieved to produce a simulated fresh whole milk, with a mixture of about 50% nonhydrogenated oil and about 50% hydrogenated oil is used. With this ratio, the 50% hydrogenated portion is hydrogenated by conventional techniques to a higher melting point than the final melting point. This portion could be a mixture of soy oil, corn oil, safflower oil, and coconut oil, for example. The entire vegetable oil ingredient could alternatively be hydrogenated to a lesser extent, rather than hydrogenating a portion to a greater extent and then mixing it with another nonhydrogenated portion. By increasing the portion that is hydrogenated or increasing the degree of hydrogenation, the final product will approach the character of fresh dairy cream. Using the above guidelines, those skilled in this field can vary this process step considerably to obtain the desired results.

Combining of Ingredients

To create the simulated milk or food supplement which will have the desired protein and fat, contents, the three basic ingredients are combined in controlled proportions, to produce products having a fat content of about 10 – 65% and a protein content of about 20 – 50%. In order to obtain the desired protein content the whey and isolated soy protein should be present in an amount of about 6 – 52% isolated soy protein and about 94 – 48% whey for the non-fat portion of the product. The vegetable protein, vegetable fat, and sweet dairy whey are combined generally in the normal range of casein protein, butter fat, and whey in whole milk. The three basic ingredients are preferably in the amounts of 21.4% by weight pretreated vegetable (soy) protein, 26% vegetable fat and 52.6% sweet dairy whey.

Since the final simulated milk product has a solids content of about 12% by weight, the amount of water that can be added to the ingredients is limited since it is undesirable to subject the final product to an evaporation step. After adding the vegetable fat to the treated vegetable protein and whey suspension, it is necessary to subject the mixture to an initial homogenization, preferably two stage, to put them into a uniform suspension.

The hydrogen ion concentration of the combined materials is critical to the final product. Specifically, the pH is adjusted to a level of 6.0 – 7.5 and preferably 6.6 – 7.0. At lower pH the product will have an unsatisfactory flavor and will tend to settle out. However, a pH of 6.6 to about 6.0 could also be utilized if a buffering agent, such as disodiumphosphate were added. At a pH slightly above about 7.3 the appearance and flavor of the product are both less desirable. This pH adjustment is preferably made after the three ingredients are mixed. The pH of this mixture is normally low (acidic) and is adjusted to the necessary range by adding a food grade alkaline reagent, preferably sodium hydroxide, potassium hydroxide, calcium hydroxide, magnesium hydroxide, or soluble tribasic phosphates and combinations thereof. Generally, the lower the pH the less the ability of the protein to carry or emulsify the fat.

If the final product is to be in liquid beverage form, as is normally intended, enough water is added to the mixture to lower the solids content to about 12% by weight. If the final product is to be put into a solid powder form by drying, this dilution step is not used.

The mixture is then subjected to severe homogenization which is most readily achieved by a multiple stage, homogenization, preferably two stage. This step is important in order to provide a simulated milk character to the final product. The successive stages are at increasing working intensities. If an hydraulic pressure type homogenizer is used, the pressure at the first stage is substantially greater than that of the second stage. Preferably the pressure at the first stage is about 6,000 psi or above, although it has been found that pressures of 500 psi and 1,500 psi will provide an accpetable, though less desirable product. If a sonic vibration type homogenizer is employed, it is operated at comparable increasing intensities to get results comparable to the hydraulic type at the noted pressures. These homogenization steps are important since they not only achieve fat of oil particles size reduction for prolonged suspension, but also contribute significantly to obtaining the proper flavor characteristics. The exact technical explanation of this is not known. It has been found that more than two stages are not normally desirable because other characteristics of the product appear to decline. As previously discussed, if desired, the vegetable oil may be initially added to the isolated soy protein and whey suspension prior to the heating and vapor-flash treatment.

The final product to be used directly as a beverage is pasteurized, cooled to conrol bacteriological growth, and placed in containers such as bottles, cans sealed cartons, or tank cars.

If the final product is to be placed in powder form for later reliquification or use as an additive or the like, it is flash dried, as by spray drying techniques, and put into bags or cartons or the like.

The basic principles of the novel product and process set forth above will enable anyone having ordinary skill in the art to practice the invention, and if desired, to make controlled variations within the concept. To assure a complete understanding of the invention, the following illustrative examples are set forth.

Example 1

A. If raw soybeans are the starting material, the soybeans are flaked and the oil extracted with hexane to give defatted flakes which when ground are called soybean meal.

B. The flakes or meal are added to an aqueous bath and a food grade alkaline reagent, sodium hydroxide, is added until a pH of 10 is reached. The material is slurried for 30 minutes, and then centrifuged. The soy protein material is precipitated from the liquor by adding phosphoric or hydrochloric acid until the isoelectric point is reached at a pH of about 4.7. Normally, this precipitate is about 90 – 95% protein on a by weight basis. The precipitate is washed with water. These preliminary processing steps are generally known.

C. The precipitate is then added to water to make an aqueous slurry. The pH of the aqueous slurry is adjusted up to 6.6 with sodium hydroxide to form a colloidal suspension. Sweet dairy whey obtained as a by-product from cheddar cheese manufacturing is then blended into the slurry. To produce a product having 15% protein and 40% fat, a suspension is formed with the soy isolate being about 17% and the whey about 83% with the solids content of the slurry or suspension being 15%.

D. The suspension is then passed through a jet cooker under a pressure of 85 psig, simultaneously with steam ejection from the jet cooker under a pressure of 75 psig. The steam heats the suspension almost instantaneously, e.g., in about one second, to a temperature of 310° F. The heated suspension is held for seven seconds under the elevated pressure which is high enough to prevent vaporization at that temperature, and then progressive portions of the heated suspension are discharged into a receiver at atmospheric pressure or below, causing flash off of vapors laden with obnoxious smelling and tasting substances. The suspension is cooled by the flash off vaporization. The substance laden vapors are removed from the purified suspension.

E. Hydrogenated vegetable fat having a melting point of 90° F. was then added to the mixture of isolated soy protein and whey to amount to 40% fat bybweight of the product. The pH is adjusted to 6.8 by adding sodium hydroxide.

F. The product is then passed through a two stage homogenization at pressures of 4,000 and 1,500 psi. The product is then pasteurized with or without vacuumizing, dried with a spray drier and packaged.

Example 2

The procedure of Example 1 were followed to produce a 45% protein product having 15% fat except soy isolate was about 53% the slurry and the whey about 47 % by weight.

Example 3

The starting material is an isolated peanut protein slurry, and the steps in Example 1 are followed down to F.

Example 4

A. – B. Steps A and B of Example 1 are followed.

C. A mixture of whey, fat and the soy isolate is formed with whey being present at about 43% by weight and soy isolate about 17% by weight a fat about 40% by weight to produce a product having 20% protein and 40% fat. The solids content of the suspension is about 37%.

D. The mixture is then passed through a spiratherm heater to heat the mixture to a temperature of about 310° F.

E. The heated mixture is held for 7 seconds under the elevated pressure which is high enough to prevent vaporization at that temperature.

F. The heated mixture is then subjected to atomization by ejecting successive portions of the mixture through a spray nozzle which effectively physically works the product and sufficiently exposes portions thereof to permit the flash off vaporization of undesirable flavor and odor causing constituents. The vapors are removed from the purified mixture.

G. The product is then passed through a two stage homogenization at pressures of 4,000 and 1,500 psi. The product is then pasteurized with or without vacuumizing, dried with a spray drier and packaged.

Hundreds of additional examples could be set forth, but would only unduly lengthen this description because the teachings are clearly set forth. Those having ordinary skill in the art will recognize several variations of the process and product described within the unique concepts set forth. It is therefore intended that the invention encompass all such variations within the scope of the claims attached and all reasonable equivalents thereof.

I claim:

1. A method of preparing a simulated milk type product comprising the steps of: preparing a neutralized aqueous suspension of an isolated vegetable protein ingredient and sweet dairy whey, having a solids content within the range of 3 – 50%, with the protein content being in the range of about 7 – 50%, controlling the pH of the suspension within the range of about 5.8 – 7.5, heating the suspension rapidly to temperatures of about 220° F. to about 400° F., and subjecting it to dynamic physical working, retaining the suspension for a brief period of time under a positive pressure sufficiently high to prevent volatilization of heated water vapor from the heated suspension, suddenly releasing the pressure to cause flash off volatilization of vapor laden with substances that possess undesirable flavor and odor characteristics, separating the vapors from the treated suspension, blending said treated suspension with from about 8 – 65% vegetable fat having a melting point generally of about 77 – 104° F., to cause said vegetable protein to act as a fat and water binder, controlling the pH of the mixure within the range of about 6.0 – 7.5 and subjecting the mixture to severe homogenization for effecting proper flavor as well as excellent dispersion.

2. The method of claim 1 including the step of drying the product to a powder.

3. The method of claim 1 wherein the isolated vegetable protein ingredient is isolated soy protein.

4. The method of claim 3 wherein the solids content of the suspension is within the range of 5 – 45% the protein content is 15 – 45% and said heating is to a temperature in the range of 285° F. –320° F. with said suspension being retained under pressure for about 7 seconds to about 100 seconds prior the the pressure release.

5. The method of claim 4 wherein the isolated soy protein is present in an amount from about 6 – 53% and the sweet dairy whey being present in an amount from about 94 – 47% of the non-fat portion of the product and the vegetable fat being present in an amount from about 15 – 45% by weight of the product.

6. The method in claim 5 wherein at least a portion of said vegetable fat is hydrogenated sufficiently to effect a combined melting point of the entire vegetable fat ingredient of about 84° – 97° F.

7. A method of preparing a simulated milk type product comprising the steps of: preparing a suspension of isolated soy protein and sweet dairy whey, having a solids content within the range of 3 – 50%, the protein content of the suspension being about 7% – 50%, controlling the pH of the suspension within the range of about 5.8 – 7.5, heating the suspension in a heater to a temperature of about 220° F. to about 400° F., retaining the suspension at that temperature for a brief period of time under a positive pressure sufficiently high to prevent volatilization of heated water vapor from the heated suspension, suddenly releasing the pressure to cause flash off volatilization of vapor laden with substances that possess undesirable flavor and odor characteristics, subjecting the suspension to sufficient atomization during the pressure release to obtain sufficient exposure of the surfaces of the particles of the suspension to effect the flash off vaporization, separating the vapors from the treated suspension, blending said treated suspension with from about 8 – 65% vegetable fat having a melting point generally of about 77 – 104° F., to cause said soy protein to act as a fat and water binder, controlling the pH of the mixture within the range of about 6.0 – 7.5, and subjecting the mixture to severe homogenization for effecting proper flavor as well as excellent dispersion.

8. The method of claim 7 including the step of drying the product to a powder.

9. The method in claim 8 wherein the pH of the suspension is adjusted to 6.2 – 6.9 by adding one of the food grade alkaline reagents consisting of sodium hydroxide, calcium hydroxide, potassium hydroxide, magnesium hydroxide, and mixtures thereof following the separation of the vapors from the suspension.

10. The method of claim 7 wherein the solids content of the suspension is within the range of 5 – 45%, and the heating of the suspension is to a temperature within the range of 285° – 320° F., with said suspension being retained under pressure for about 7 seconds to about 100 seconds prior to the pressure release.

11. The method of claim 10 wherein the isolated soy protein is present in an amount from about 6 – 53% and the sweet dairy whey being present in an amount from about 94 – 47% of the non-fat portion of the product, and the vegetable fat being present in an amount from about 15 – 45% by weight of the product.

12. A method of preparing a simulated milk type product comprising the steps of: preparing a suspension of isolated soy protein, sweet dairy whey and vegetable fat, the vegetable fat being present in the suspension within the range of about 8 – 65% and having a melting point generally about 77° – 104° F., the non-fat portion of the suspension containing soy protein isolated and sweet dairy whey in an amount to form a product having a protein content in the range of about 7 – 50%, controlling the pH of the suspension within the range of about 5.8 – 7.5, heating the suspension rapidly to a temperature of about 220° F. to about 400° F. and subjecting it to dynamic physical working, retaining the suspension under pressure for about 7 seconds to 100 seconds under a positive pressure sufficiently high to prevent volatilization of heated water vapor from the heated suspension, suddenly releasing the pressure to cause flash off volatilization of vapor laden with substances that possess undesirable flavor and odor characteristics, separating the vapors from the treated suspension, controlling the pH of the suspension within the range of 6.0 – 7.5 and subjecting the suspension to severe homogenization for effecting proper flavor as well as excellent dispersion of the product.

Favorable reconsideration of the application is respectfully requested.

13. The method of claim 12 including the step of drying the product to a powder.

14. The method of claim 13 wherein the isolated soy protein is present in an amount from about 6 – 53%, and the sweet dairy whey being present in an amount from about 94 – 47% of the non-fat portion of the product, and the vegetable fat being present in an amount from about 15 – 45% by weight of the product.

* * * * *

UNITED STATES PATENT OFFICE
CERTIFICATE OF CORRECTION

Patent No. 3,843,828     Dated October 22, 1974

Inventor(s) Robert H. Arndt

It is certified that error appears in the above-identified patent and that said Letters Patent are hereby corrected as shown below:

column 3, line 35 - "concenrating" should be "concentrating".
column 3, line 39 - "of" should be "or".
column 6, line 19 - "shold" should be "should", "conductd" should be "conducted".
column 6, line 56 - "sever" should be "severe".
column 7, line 16 - "conconut" should be "coconut".
column 7, line 62 - "," should not be after the word "fat,"
column 7, line 65 - "10" should be "8" and "20" should be "7".
column 7, line 66 - right after "content" insert "of 15 - 40% in a product having a fat content of 15 - 45%"
column 7, line 67 - "preferably" should be inserted after "protein".
column 8, line 1 - "52%" should be "53%".
column 8, line 2 - "48%" should be "47%".
column 9, line 2 - "conrol" should be "control".
column 9, line 58 - "bybweight" should be "by weight".
column 10, line 2 - immediately before the "." insert "and only enough fat was added to amount to 15% fat by weight of the product."
column 11, line 5 - "45%" should be "40%".
column 11, line 8 - the first "the" should be "to".
column 11, line 15 - "in" should be "of".
column 12, line 21 - "isolated" should read "isolate".
column 12, line 40 - 41 - delete "Favorable reconsideration of the application is respectfully requested."

Signed and sealed this 1st day of April 1975.

(SEAL)
Attest:

RUTH C. MASON
Attesting Officer

C. MARSHALL DANN
Commissioner of Patents
and Trademarks